Dec. 24, 1935. H. B. LEMON 2,025,352
PACKAGE
Filed Dec. 20, 1934
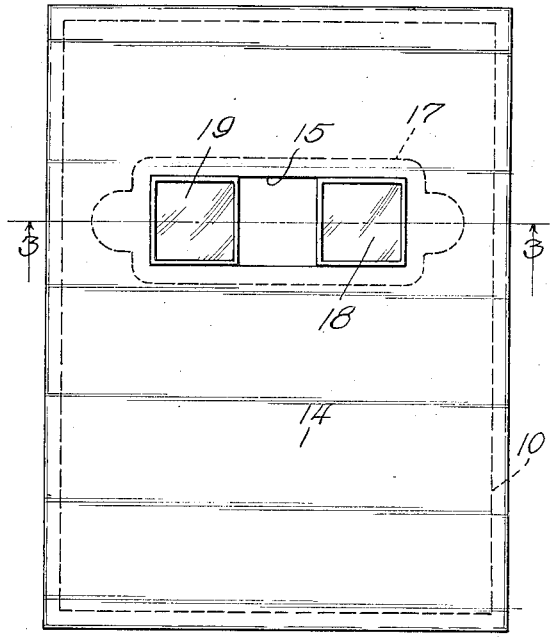
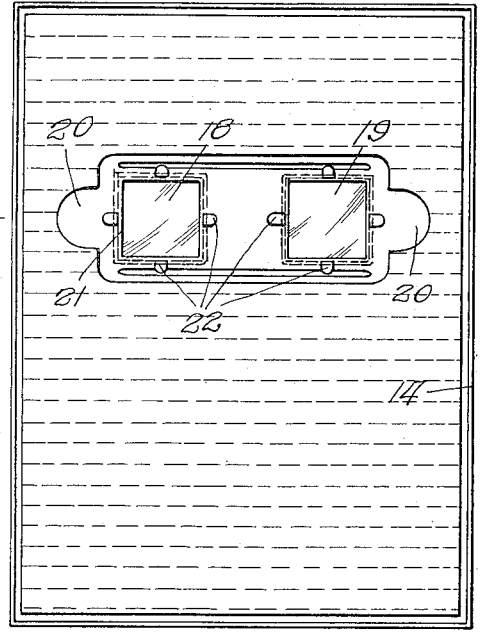
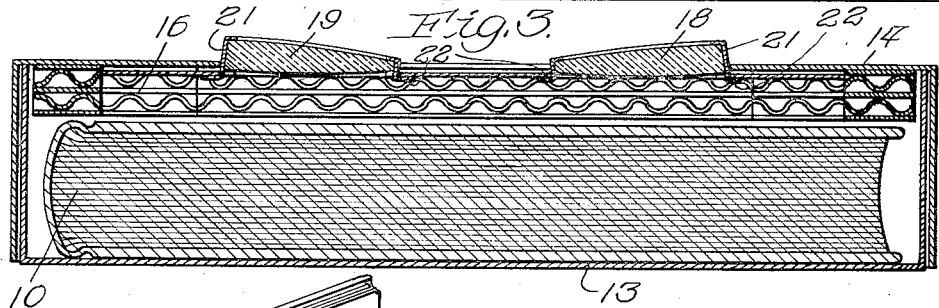
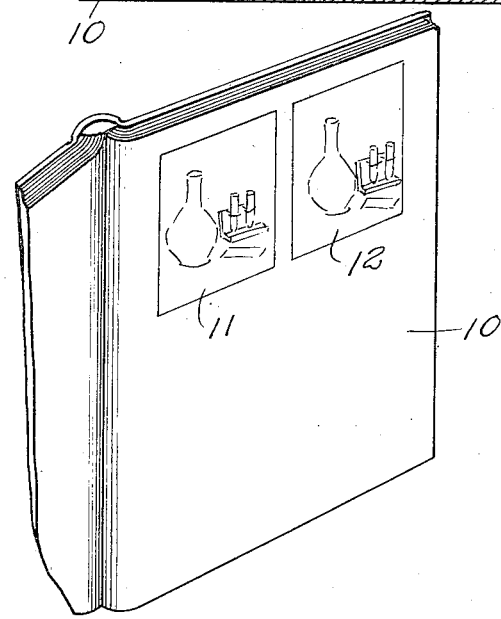
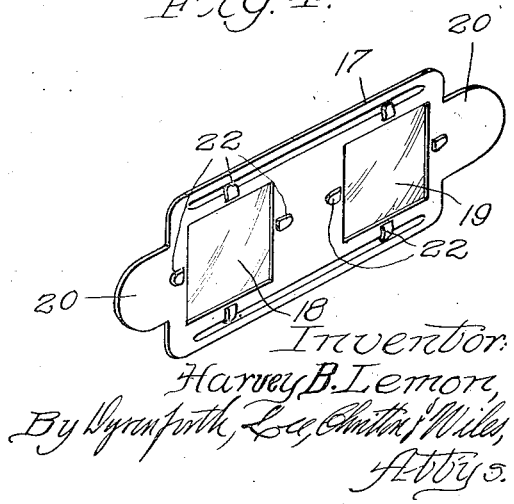
Inventor:
Harvey B. Lemon,
By Dynrenforth, Lee, Chritton & Wiles,
Attys.

Patented Dec. 24, 1935

2,025,352

UNITED STATES PATENT OFFICE 2,025,352

PACKAGE

Harvey B. Lemon, Chicago, Ill.

Application December 20, 1934, Serial No. 758,509

2 Claims. (Cl. 206—47)

This invention relates to packages, and more particularly to a package for stereoscopic lenses and pictures.

In that form of device embodying the features of my invention shown in the accompanying drawing,—

Fig. 1 is a top plan view of the box and lenses; Fig. 2 is a view of the inner side of the box cover; Fig. 3 is a sectional view along the line 3—3 of Fig. 1; and Fig. 4 is a view illustrating the relation between the lenses and the illustrations.

While stereoscopic pictures have been commonly known and used in a variety of ways, their full effectiveness as illustrations has never been completely utilized. In a physics test, for example, stereoscopic illustrations of laboratory apparatus and experiments are very effective in bringing to the student or reader a clearer conception of the actual apparatus.

In the particular embodiment of the invention illustrated herewith, a book 10 is shown, this book having stereoscopic illustrations, as the pictures 11 and 12. A carton, or box, 13 is adapted to receive therein the book 10, and this box is provided with a cover 14. The cover has therethrough an opening 15, which opening is here shown as rectangular in shape. On the inner side of the cover is mounted or attached, as by gluing, a piece of packing material or cellular cardboard 16. The packing material has an opening 17 therethrough, which opening is somewhat larger than the opening 15, and substantially in registry therewith.

A pair of stereoscopic lenses 18 and 19 are shown, which lenses are mounted in a frame 20 by any convenient means, as for example by rims 21 and clips 22. Lenses 18 and 19 are properly ground and mounted in the frame 20 to provide the illusion of three dimensional pictures, when the illustrations 11 and 12 are viewed through the lenses at their proper focal distance from the book 10, as in the relation illustrated in Fig. 4.

The lens frame 20 is a pressed fit into the opening 17 in the packing material 16. When boxed, the book 10 is placed in the box, the frame 20 is pressed into the opening in the packing material 16 with the lenses 18 and 19 in registry with the opening 15, and preferably projecting slightly therethrough when the box is on a display shelf, the lenses and packing material in no way interfering with the complete closure of the box by the cover. Fig. 3 illustrates the book and lenses as thus assembled in the box.

The lenses are visible from the outside of the box and are an indication that the book contained therein is not of the ordinary type. Moreover, the fact that the lenses are in registry with the opening in the cover permit a prospective purchaser in a book store, for example, to remove the cover, hold it in his hands, and examine the stereoscopic illustrations in the book without removing the lenses from the cover. On the other hand, should the owner of the book subsequently prefer to separate the lenses from the cover and use them in the manner illustrated in Fig. 4, the fact that the frame makes only a pressed fit with the packing material 16 permits them to be easily removed therefrom.

The packing material 16 is of substantial thickness, such that the combined thickness of the packing material and the cover 14 is at least equal to the thickest portion of the frame 20 in which the lenses are mounted. Since the frame 20 is a pressed fit in the packing material 16, any pressure on the lenses, as for example by piling the boxes on top of each other for shipment or storage, will cause the frame to recede into the box and permit the lenses to assume a position flush with or below the surface of the cover. The box is so designed, moreover, that when closed the underside of the packing material 16 is close to the top of the book 10, the space being so small that it is impossible for the frame and lenses to slip out of the opening in the packing material provided therefor. The cover, since the opening therein is smaller than the frame, forms a flange around the opening in the packing material, and thus when the box is closed the frame is positively retained within that opening, by the flange above and by the book below.

The illustrations in the book are of the type known commercially as "half-tones". Such pictures are printed by the use of screens of very fine mesh, which result in a picture composed of a multitude of dots or points, rather than solid lines. In order that the dots forming the background, for example, should not be unduly accentuated through the use of the stereoscopic apparatus described herein, the two cooperating illustrations, as 11 and 12, are printed with their screens slightly out of registry.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. A package for a stereoscopically illustrated book and a stereoscope of the type consisting of a pair of lenses and a flat lens-holding frame of larger size than the lens, said package including a cover in which is an opening of substantially the size of the lens portion of the stereoscope and within which is a spacing member whose thickness together with that of the cover is as great as the thickness of the stereoscope, the spacing member being pierced by an opening of the size of the stereoscope frame, said opening being positioned to hold the stereoscope by its frame with its lenses opposite the cover opening, the depth of the package being so coordinated to the book that when closed with the book in place the space between the book and the spacing member is less than the thickness of the stereoscope whereby a series of similar packages may be stacked with the stereoscope guarded from pressure by the spacing members while the stereoscopes are positively held in the spacing member openings by the books beneath them.

2. The package of claim 1 wherein the opening in the cover is larger than said lenses but smaller than said frame, whereby the stereoscope lenses may be protruded beyond the plane of the cover.

HARVEY B. LEMON.